(12) United States Patent
Tsuchiya et al.

(10) Patent No.: US 10,539,831 B2
(45) Date of Patent: Jan. 21, 2020

(54) LIQUID CRYSTAL DISPLAY DEVICE

(71) Applicant: SHARP KABUSHIKI KAISHA, Sakai, Osaka (JP)

(72) Inventors: Hiroshi Tsuchiya, Sakai (JP); Masanobu Mizusaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 69 days.

(21) Appl. No.: 15/577,884

(22) PCT Filed: May 23, 2016

(86) PCT No.: PCT/JP2016/065118
§ 371 (c)(1),
(2) Date: Nov. 29, 2017

(87) PCT Pub. No.: WO2016/194668
PCT Pub. Date: Dec. 8, 2016

(65) Prior Publication Data
US 2018/0164616 A1    Jun. 14, 2018

(30) Foreign Application Priority Data
May 29, 2015 (JP) .................. 2015-110249

(51) Int. Cl.
*G02F 1/1337*    (2006.01)
*C09K 19/02*    (2006.01)
(Continued)

(52) U.S. Cl.
CPC ............ *G02F 1/1337* (2013.01); *C09K 19/02* (2013.01); *C09K 19/348* (2013.01); *C09K 19/54* (2013.01); *G02F 1/1343* (2013.01); *C09K 2019/548* (2013.01); *Y10T 428/1014* (2015.01); *Y10T 428/1023* (2015.01)

(58) Field of Classification Search
CPC .... G02F 1/1334; G02F 1/1343; G02F 1/1368; G02F 1/133711; G02F 1/133719; G02F 1/133723; G02F 2001/133742; C09K 19/02; C09K 19/348; C09K 19/54;
(Continued)

(56) References Cited

U.S. PATENT DOCUMENTS 3,531,414 A * 9/1970 Howard ............... C07D 249/18
422/8
2013/0183460 A1    7/2013 Klasen-Memmer et al.
2015/0203758 A1    7/2015 Klasen-Memmer et al.

FOREIGN PATENT DOCUMENTS

JP    2013-144796 A    7/2013

* cited by examiner

*Primary Examiner* — Sophie Hon
(74) *Attorney, Agent, or Firm* — ScienBiziP, P.C.

(57) ABSTRACT

The present invention provides a liquid crystal display device that can exhibit a long-lasting favorable voltage holding ratio and prevent deterioration of reliability. The liquid crystal display device of the present invention includes: paired substrates disposed to face each other; a liquid crystal layer disposed between the substrates; and an alignment film disposed between at least one of the substrates and the liquid crystal layer, the at least one of the substrates including an electrode and/or a conductive line that contain(s) copper or aluminum, the liquid crystal layer containing a liquid crystal component and an additive component with a chemical structure including a benzotriazole group represented by a given chemical formula.

12 Claims, 2 Drawing Sheets

(51) Int. Cl.
*C09K 19/54* (2006.01)
*C09K 19/34* (2006.01)
*G02F 1/1343* (2006.01)

(58) Field of Classification Search
CPC .............. C09K 19/56; C09K 2019/548; Y10T 428/1005; Y10T 428/1014; Y10T 428/1023
See application file for complete search history.

LIQUID CRYSTAL DISPLAY DEVICE

TECHNICAL FIELD

The present invention relates to liquid crystal display devices. The present invention more specifically relates to a liquid crystal display device including an alignment film.

BACKGROUND ART

Liquid crystal display devices having characteristics such as a thin profile, light weight, and low power consumption have been used in applications such as smartphones, tablet PCs, and automotive navigation systems, as well as televisions. In these applications, liquid crystal display devices are required to demonstrate various performances, and thus liquid crystal layers constituting such liquid crystal display devices are also required to demonstrate high performances. In order to achieve such a liquid crystal layer, Patent Literature 1, for example, discloses a liquid crystal medium obtained by adding an additive to a liquid crystal material.

CITATION LIST

Patent Literature

Patent Literature 1: JP 2013-144796 A

SUMMARY OF INVENTION

Technical Problem

A conventional liquid crystal display device, however, may cause image sticking to deteriorate the reliability after long-term use in the case of utilizing electrodes and/or conductive lines that contain copper or aluminum. The inventors have made various studies on the cause of this defect, and have found that the image sticking occurs through at least one of the following two pathways. Although the electrodes and/or conductive lines below are described to contain copper, similar pathways take place also in the case where electrodes and/or conductive lines contain aluminum.

[Pathway 1]

(1-1) Moisture Entry

Through a sealant provided in a liquid crystal display device and an interface between the sealant and an alignment film, external moisture enters the liquid crystal display device.

(1-2) Copper Ion Generation

Since electrodes and/or conductive lines are generally in contact with an alignment film (organic film), the moisture having entered the liquid crystal display device comes into contact with the electrodes and/or conductive lines via the alignment film. As a result, the moisture ionizes copper contained in the electrodes and/or conductive lines, and eventually enters the liquid crystal layer together with copper ions ($Cu^{2+}$ and $Cu^{3+}$). At this time, the liquid crystal layer (liquid crystal component) is more likely to take in moisture in the case of containing liquid crystal molecules having a negative anisotropy of dielectric constant (hereinafter, also referred to as negative liquid crystal) than in the case of containing liquid crystal molecules having a positive anisotropy of dielectric constant (hereinafter, also referred to as positive liquid crystal). That is, copper ions are more likely to be taken into negative liquid crystal than into positive liquid crystal. This is because the polarity of negative liquid crystal is higher than that of positive liquid crystal. Negative liquid crystal has high polarity because it contains more oxygen (—O—), fluorine (—F), and chlorine (—Cl) atoms with high polarity in liquid crystal molecules than positive liquid crystal and contains fluorine and an alkoxyl group containing oxygen in one liquid crystal molecule.

(1-3) Radical Generation

As shown in the following formulas (A-1) and (A-2), a redox reaction occurs between copper ions and carboxylic acid (carboxyl groups) in a polymer (e.g., polyamic acid) contained in the alignment film under the influence of heat or light, for example, so that radicals are generated in the alignment film.

[Chem. 1]

(A-1)

(A-2)

(1-4) Occurrence of Image Sticking

The radicals generated in the alignment film move to the liquid crystal layer, and are ionized by electron transfer to form ionic impurities. This increases the ionic density in the liquid crystal layer to decrease the voltage holding ratio (VHR), causing image sticking.

[Pathway 2]

(2-1) Moisture Entry

Through a sealant provided in a liquid crystal display device and an interface between the sealant and an alignment film, external moisture enters the liquid crystal display device.

(2-2) Copper Ion Generation

The moisture having entered the liquid crystal display device comes into contact with the electrodes and/or conductive lines via the alignment film. As a result, the moisture ionizes copper contained in the electrodes and/or conductive lines, and eventually enters the liquid crystal layer together with copper ions ($Cu^{2+}$ and $Cu^{3+}$).

(2-3) Formation of Carboxylic Acid

Figure 4:
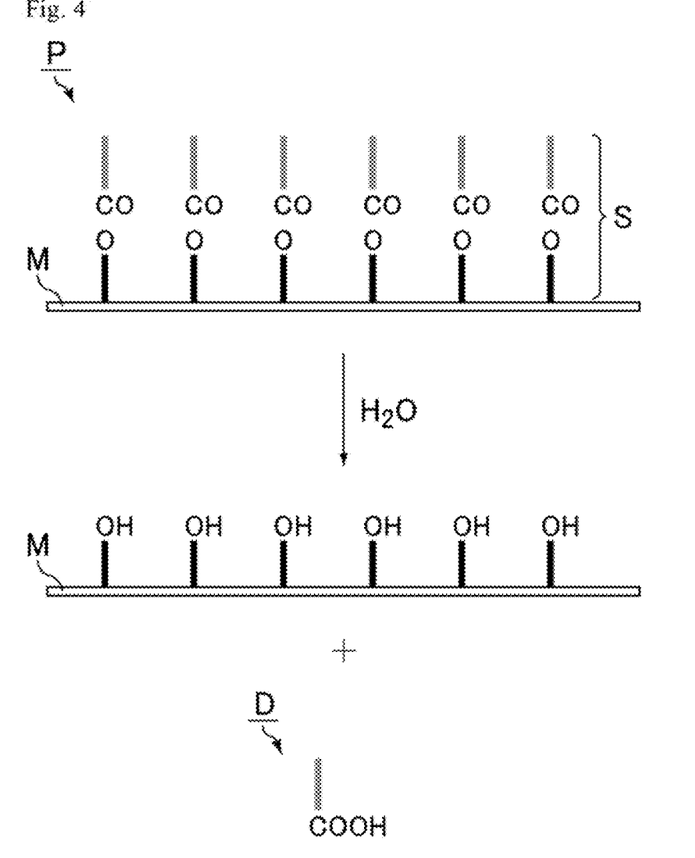
FIG. 4 is a schematic view showing how a —OCO— ester bond is dissociated.

FIG. 4 is a schematic view showing how a —OCO— ester bond is dissociated. As shown in FIG. 4, in an alignment film containing a polymer P with a main chain M and a side chain S including a —OCO— ester bond, the —OCO— ester bond is hydrolyzed by moisture and is thereby dissociated, forming a carboxyl group-terminated dissociation product D of carboxylic acid. This dissociation product D is transferred to (enters) the liquid crystal layer. An example of this reaction is shown in the following formula (B).

[Chem. 2]

-continued

In the above formula (B), p represents an integer of 1 or greater.

(2-4) Radical Generation

As shown in the above formulas (A-1) and (A-2), a redox reaction occurs between copper ions and the carboxyl group-terminated dissociation product of carboxylic acid under the influence of heat or light, for example, so that radicals are generated in the liquid crystal layer.

(2-5) Occurrence of Image Sticking

The radicals generated in the liquid crystal layer are ionized by electron transfer to form ionic impurities. This increases the ionic density in the liquid crystal layer to decrease the voltage holding ratio, causing image sticking.

Patent Literature 1 discloses a liquid crystal medium obtained by adding an additive to a liquid crystal material. The invention disclosed in Patent Literature 1, however, is not made to prevent the generation of radicals in redox reactions described above. The invention can therefore still be improved to reduce generation of ionic impurities by radicals in the liquid crystal layer.

The present invention has been made in view of the above current state of the art, and aims to provide a liquid crystal display device that can exhibit a long-lasting favorable voltage holding ratio and prevent deterioration of reliability.

Solution to Problem

The inventors have made various studies on a liquid crystal display device that can exhibit a long-lasting favorable voltage holding ratio and prevent deterioration of reliability. The inventors have then focused on prevention of the redox reaction between copper ions (aluminum ions) and carboxylic acid described above. Their studies have shown that adding an additive component with a chemical structure including a benzotriazole group to a liquid crystal layer forms a complex between copper ions (aluminum ions) and the benzotriazole group, enabling reduction of redox reactions. As a result, radical generation is reduced, so that generation of ionic impurities by radicals can be reduced in the liquid crystal layer and thus a decrease in the voltage holding ratio can be prevented. Thereby, the inventors have arrived at a solution to the above problem, and accomplished the present invention.

One aspect of the present invention may be a liquid crystal display device including: paired substrates disposed to face each other; a liquid crystal layer disposed between the substrates; and an alignment film disposed between at least one of the substrates and the liquid crystal layer, the at least one of the substrates including an electrode and/or a conductive line that contain(s) copper or aluminum, the liquid crystal layer containing a liquid crystal component and an additive component with a chemical structure including a benzotriazole group represented by the following chemical formula (1).

[Chem. 3]

(1)

Advantageous Effects of Invention

The present invention can provide a liquid crystal display device that can exhibit a long-lasting favorable voltage holding ratio and can prevent deterioration of reliability.

DESCRIPTION OF EMBODIMENTS

The present invention is described in more detail below based on an embodiment with reference to the drawings. The embodiment, however, is not intended to limit the scope of the present invention. The configurations of the embodiment may appropriately be combined or modified within the spirit of the present invention.

Embodiment

Figure 1:
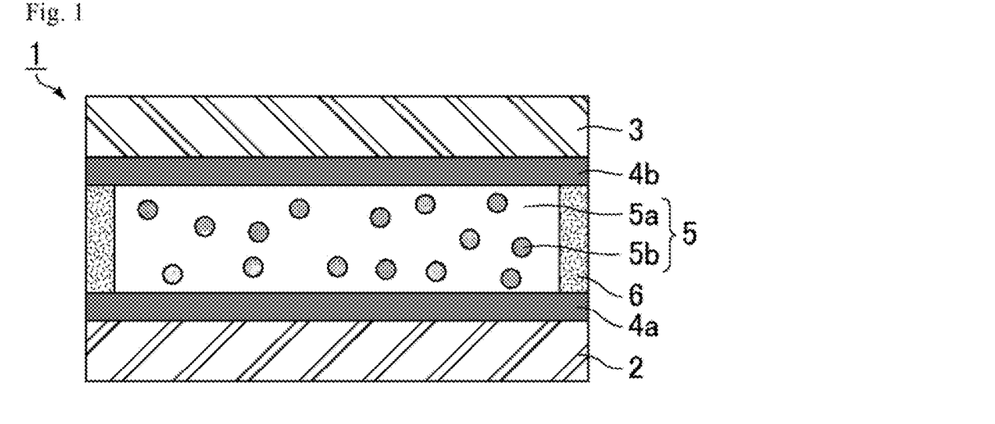
FIG. 1 is a schematic cross-sectional view of a liquid crystal display device of an embodiment.

FIG. 1 is a schematic cross-sectional view of a liquid crystal display device of an embodiment. As shown in FIG. 1, a liquid crystal display device 1 includes a lower substrate 2, an upper substrate 3 facing the lower substrate 2, a liquid crystal layer 5 disposed between the substrates, an alignment film 4a, an alignment film 4b, and a sealant 6. The alignment film 4a is disposed between the lower substrate 2 and the liquid crystal layer 5. The alignment film 4b is disposed between the upper substrate 3 and the liquid crystal layer 5. The sealant 6 is disposed to surround the liquid crystal layer 5. The liquid crystal display device 1 may further include a backlight, and may include paired polarizing plates on the surfaces of the respective lower substrate 2 and upper substrate 3 opposite to the liquid crystal layer 5.

At least one of the lower substrate 2 and the upper substrate 3 includes electrodes and/or conductive lines that contain copper or aluminum. Examples of such a substrate including electrodes and conductive lines include a thin-film transistor array substrate. An exemplary structure of the thin-film transistor array substrate is described below with reference to FIG. 2 and FIG. 3. In the following case, the lower substrate 2 is a thin-film transistor array substrate.

Figure 2:
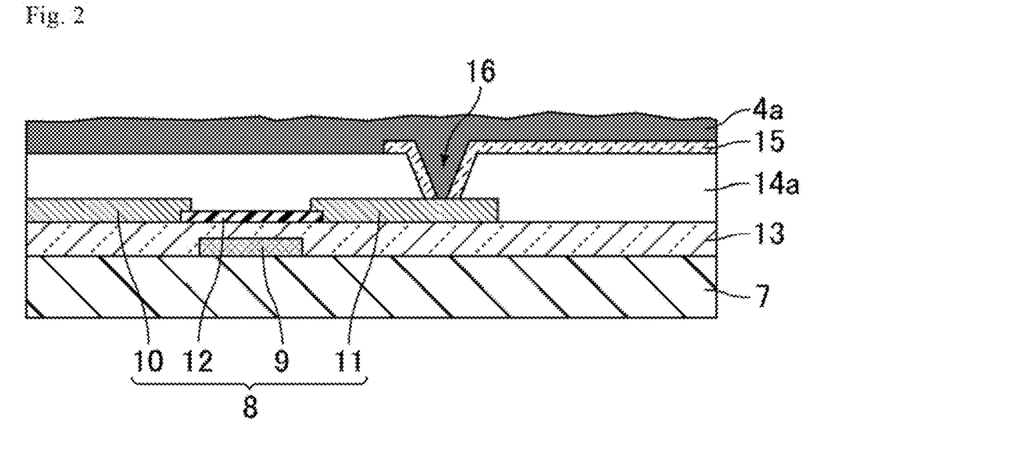
FIG. 2 is a schematic cross-sectional view of an exemplary structure of a thin-film transistor array substrate.

FIG. 2 is a schematic cross-sectional view of an exemplary structure of the thin-film transistor array substrate. As shown in FIG. 2, the thin-film transistor array substrate includes a transparent substrate 7, a thin-film transistor element 8, a gate insulator 13, an interlayer insulating film 14a, and a pixel electrode 15. The thin-film transistor element 8 includes a gate electrode 9, a source electrode 10, a drain electrode 11, and a semiconductor layer 12 electrically connected to the source electrode 10 and the drain electrode 11. The gate electrode 9 is disposed on the transparent substrate 7. The gate insulator 13 covers the gate electrode 9. The source electrode 10, the drain electrode 11, and the semiconductor layer 12 are disposed on the gate insulator 13. The interlayer insulating film 14a covers the source electrode 10, the drain electrode 11, and the semiconductor layer 12. A contact hole 16 is provided in the interlayer insulating film 14a. The pixel electrode 15 is disposed on the interlayer insulating film 14a and electrically connected to the drain electrode 11 through the contact hole 16. The thin-film transistor array substrate further includes conductive lines such as a gate bus line electrically connected to the gate electrode 9 and a source bus line electrically connected to the source electrode 10.

Figure 3:
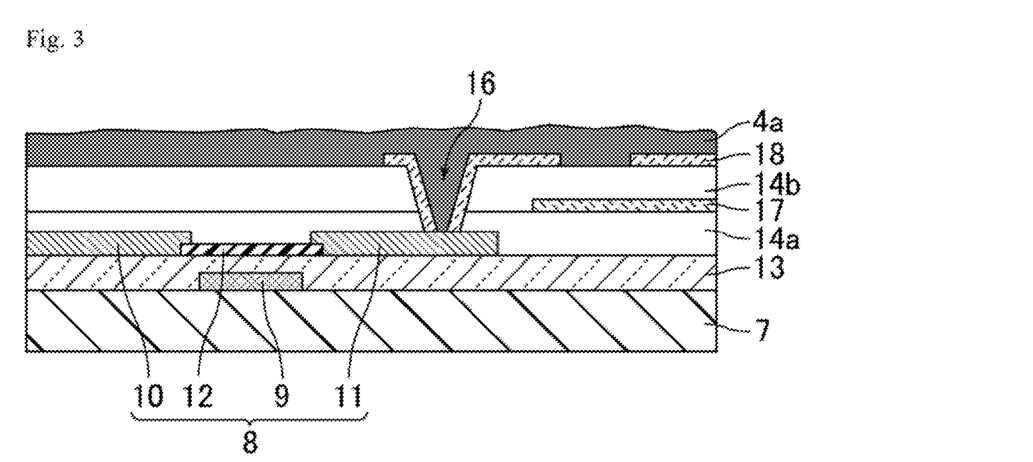
FIG. 3 is a schematic cross-sectional view of an exemplary structure of a thin-film transistor array substrate which is different from the structure shown in FIG. 2.

FIG. 3 is a schematic cross-sectional view of an exemplary structure of the thin-film transistor array substrate which is different from the structure shown in FIG. 2. The thin-film transistor array substrate shown in FIG. 3 is similar to the thin-film transistor array substrate shown in FIG. 2 except for having a two-layer electrode structure, and thus description of similar structures is appropriately omitted to avoid repetition. As shown in FIG. 3, a lower layer electrode 17 is disposed on the interlayer insulating film 14a. An interlayer insulating film 14b covers the lower layer electrode 17. The contact hole 16 is provided in the interlayer insulating film 14b. An upper layer electrode 18 is disposed on the interlayer insulating film 14a and the interlayer insulating film 14b, and is electrically connected to the drain electrode 11 through the contact hole 16.

Examples of the transparent substrate 7 include a glass substrate and a plastic substrate.

At least one of the gate electrode 9, the source electrode 10, the drain electrode 11, and the conductive line (e.g., gate bus line, source bus line) contains copper or aluminum. Copper and aluminum, having sufficiently high conductivity, can reduce capacitive load in the liquid crystal display device. These can therefore be appropriate materials of electrodes and/or conductive lines in a high-definition (e.g., full high-definition or higher) or large-sized (e.g., 10-inch or larger) liquid crystal display device. The source electrode 10 is in direct contact with the interlayer insulating film 14a. The drain electrode 11 is in direct contact with both the interlayer insulating film 14a and the alignment film 4a.

Examples of the semiconductor layer 12 include those containing a material such as amorphous silicon, low-temperature polysilicon, or oxide semiconductor, with those containing an oxide semiconductor being preferred. Examples of the oxide semiconductor include compounds containing indium, gallium, zinc, and oxygen, compounds containing indium, tin, zinc, and oxygen, compounds containing indium, aluminum, zinc, and oxygen, and compounds containing indium, zinc, and oxygen. An oxide semiconductor formed of a compound containing indium, gallium, zinc, and oxygen generates a low off-state leakage current, and thus enables, when voltage is applied thereto, paused drive in which the voltage is held until the next data is input. The oxide semiconductor is therefore preferably formed of a compound containing indium, gallium, zinc, and oxygen from the viewpoint of low power consumption.

The interlayer insulating film 14a may be an organic or inorganic film. The interlayer insulating film 14b may be an organic or inorganic film.

Examples of the material of the pixel electrode 15, the lower layer electrode 17, and the upper layer electrode 18 include transparent materials such as indium tin oxide (ITO) and indium zinc oxide (IZO).

In the present embodiment, the lower substrate 2 is a thin-film transistor array substrate and includes electrodes and/or conductive lines that contain copper or aluminum. Here, the upper substrate 3 may be, for example, a color filter substrate including a member such as a color filter layer on a transparent substrate. The color filter layer may include color filters in any color combination such as a combination of red, green, and blue and a combination of red, green, blue, and yellow. The color filter substrate may include a common line and a common electrode electrically connected to the common line or may include structural members such as ribs, depending on the display mode of the liquid crystal display device 1. Examples of the material of the common electrode include transparent materials such as ITO and IZO. The color filter layer may be disposed only in the thin-film transistor array substrate.

The lower substrate 2 and the upper substrate 3 may be substrates in any combination other than the combination described above as long as at least one of the substrates includes electrodes and/or conductive lines that contain copper or aluminum.

The liquid crystal layer 5 contains a liquid crystal component 5a and an additive component 5b with a chemical structure including a benzotriazole group represented by the following chemical formula (1).

[Chem. 4]

(1)

Adding the additive component 5b with a chemical structure including a benzotriazole group to the liquid crystal layer 5 forms a complex between copper ions (aluminum ions) and the benzotriazole group, so that redox reactions between the copper ions (aluminum ions) and carboxylic acid can be prevented. As a result, generation of radicals is reduced, and thus generation of ionic impurities by radicals can be reduced in the liquid crystal layer 5, whereby a decrease in the voltage holding ratio can be prevented. Also, since the benzotriazole group has a function of absorbing UV light, adding the additive component 5b with a chemical structure including a benzotriazole group to the liquid crystal layer 5 can also enhance the light resistance.

The chemical structure including a benzotriazole group preferably includes a structure represented by the following chemical formula (2).

[Chem. 5]

(2)

In the chemical formula (2), $R^1$ represents a —O— group, —S— group, —NH— group, —CO— group, —COO— group, —OCO— group, —NHCO— group, —CONH— group, —CH$_2$— group, —CF$_2$— group, or direct bond; $R^2$ represents —R$^3$-Bt, a hydrogen atom, halogen atom, —CN group, —NO$_2$ group, —NCO group, —NCS group, —OCN group, —OH group, or C1-C18 linear or branched alkyl group; and Bt is represented by the following chemical formula (1).

[Chem. 6]

(1)

$R^3$ represents a C1-C18 linear or branched alkylene group; a hydrogen atom in $R^3$ may be replaced with a fluorine atom or chlorine atom; $A^1$ and $A^2$ are the same as or different from each other and each represent a 1,4-phenylene group, naphthalene-1,4-diyl group, naphthalene-2,6-diyl group, 1,4-cyclohexylene group, or C2-C18 alkyl, alkylene, unsaturated alkyl, or unsaturated alkylene group; —$CH_2$— groups contained in $A^1$ and $A^2$ may each be replaced with a —O— group or —S— group, unless they are adjacent to each other; at least one of hydrogen atoms in $A^1$ and $A^2$ may be replaced with a fluorine atom, chlorine atom, —CN group, or C1-C6 alkyl, alkoxy, alkylcarbonyl, alkoxycarbonyl, or alkylcarbonyloxy group; Z represents a —O— group, —S— group, —NH— group, —CO— group, —COO— group, —OCO— group, —NHCO— group, —CONH— group, —$CH_2$— group, —$CF_2$— group, or direct bond; and n represents 0, 1, or 2.

The additive component 5b with a chemical structure represented by the above chemical formula (2) can appropriately prevent a decrease in the nematic-isotropic phase transition temperature ($T_{NI}$) of the liquid crystal component 5a. The additive component 5b preferably has a rod-like shape similar to a liquid crystal molecule. For example, with a rod-like chemical structure shown in the above chemical formula (2), the additive component 5b can appropriately be prevented from inhibiting the alignment performance of liquid crystal molecules.

The additive component 5b preferably has a molecular weight in the range of 300 to 3000. The additive component 5b having a molecular weight of 300 or more can appropriately be prevented from volatilizing through formation steps of the liquid crystal layer 5 (e.g., liquid crystal dropping step). The additive component 5b having a molecular weight of 3000 or less can exhibit sufficient solubility in the liquid crystal component 5a and can be prevented from separating from the liquid crystal component 5a. From a similar viewpoint, the additive component 5b preferably has a molecular weight that is at most 10 times the molecular weight of the liquid crystal molecules in the liquid crystal component 5a.

The liquid crystal layer 5 preferably contains the additive component 5b at a concentration in the range of 0.001 to 0.2 wt %, more preferably in the range of 0.001 to 0.1 wt %. The liquid crystal layer 5 containing the additive component 5b at a concentration of 0.001 wt % or higher can effectively cause the benzotriazole group to form a complex with the copper ions (aluminum ions), achieving a sufficient effect of preventing redox reactions. The liquid crystal layer 5 containing the additive component 5b at a concentration of 0.2 wt % or lower can appropriately prevent deterioration of properties such as the initial voltage holding ratio and alignment performance of liquid crystal molecules, as well as a change in the nematic-isotropic phase transition temperature ($T_{NI}$) of the liquid crystal component 5a.

The liquid crystal molecules in the liquid crystal component 5a may have a negative anisotropy of dielectric constant (may be negative liquid crystal) or positive anisotropy of dielectric constant (may be positive liquid crystal). As described above, although moisture and copper ions (aluminum ions) are more likely to be taken into negative liquid crystal than into positive liquid crystal, the additive component 5b with a chemical structure including a benzotriazole group can reduce redox reactions even in the case of being added to negative liquid crystal.

The alignment film 4a and the alignment film 4b control the alignment of liquid crystal molecules in the liquid crystal component 5a. With voltage applied to the liquid crystal layer 5 being lower than the threshold voltage (including application of no voltage), the alignment of liquid crystal molecules in the liquid crystal component 5a is controlled mainly by the alignment film 4a and the alignment film 4b. In this state, an angle formed by the long axis of a liquid crystal molecule and the surfaces of the alignment film 4a and the alignment film 4b is called a pre-tilt angle. The pre-tilt angle herein refers to an angle at which the long axis of a liquid crystal molecule tilts from the direction completely parallel to the surfaces of the alignment films. The pre-tilt angle of liquid crystal molecules defined by the alignment film 4a and the alignment film 4b may be any angle.

The alignment film 4a (alignment film 4b) preferably contains a polymer including a photo-reactive functional group. In this case, the alignment film 4a (alignment film 4b) functions as a photo-alignment film. The photo-reactive functional group refers to a functional group that can control the alignment direction of liquid crystal molecules when irradiated with light, i.e., a functional group that can exert alignment controlling force.

The photo-reactive functional group preferably includes at least one functional group selected from the group consisting of a cinnamate group, chalcone group, coumarin group, azobenzene group, and tolane group.

The alignment film 4a (alignment film 4b) may align liquid crystal molecules in the liquid crystal component 5a in a direction parallel to the surface of the alignment film 4a (alignment film 4b) (hereinafter, such an alignment film is also referred to as a horizontal alignment film). The horizontal alignment film may be any alignment film that aligns at least neighboring liquid crystal molecules in a direction parallel to the surface thereof. The direction parallel to the surface of the alignment film as used herein means a direction with which the pre-tilt angle of the liquid crystal molecules is set in the range of 0° to 5°. In the case where the liquid crystal display device 1 is in a horizontal alignment mode such as an in-plane switching (IPS) mode or a fringe field switching (FFS) mode, the liquid crystal display device 1 preferably employs horizontal alignment films. The horizontal alignment films may contain a polymer including a photo-reactive functional group as described above (hereinafter, such a horizontal alignment film is also referred to as a horizontal photo-alignment film).

The alignment film 4a (alignment film 4b) may align liquid crystal molecules in the liquid crystal component 5a in a direction perpendicular to the surface of the alignment film 4a (alignment film 4b) (hereinafter, such an alignment film is also referred to as a vertical alignment film). The vertical alignment film may be any alignment film that aligns at least neighboring liquid crystal molecules in a direction perpendicular to the surface thereof. The direction perpendicular to the surface of the alignment film as used herein means a direction with which the pre-tilt angle of the liquid crystal molecules is set in the range of 82° to 90°. In the case where the liquid crystal display device 1 is in a vertical alignment mode such as a multi-domain vertical alignment (MVA) mode or an ultra-violet induced multi-domain vertical alignment (UV2A) mode, the liquid crystal display device 1 preferably employs vertical alignment films. The vertical alignment films may contain a polymer including a photo-reactive functional group as described above (hereinafter, such a vertical alignment film is also referred to as a vertical photo-alignment film).

The alignment film 4a (alignment film 4b) may contain a polyamic acid and/or a polyimide. A polyimide can be obtained by heating a polyamic acid. In this case, the polymer in the resulting alignment film 4a (alignment film 4b) contains a polyamic acid and a polyimide at a ratio corresponding to the imidization ratio. The alignment film 4a (alignment film 4b) may contain a polysiloxane.

The alignment film 4a (alignment film 4b) may contain a polymer including a carboxyl group. Even in the case where the polymer in the alignment film 4a (alignment film 4b) includes a carboxyl group, i.e., the polymer contains carboxylic acid, the additive component 5b with a chemical structure including a benzotriazole group can prevent redox reactions between the carboxylic acid and copper ions (aluminum ions).

The alignment film 4a (alignment film 4b) may contain a polymer that contains a —OCO— ester bond in a side chain. Even in the case where the polymer in the alignment film 4a (alignment film 4b) contains a —OCO— ester bond in a side chain, the additive component 5b with a chemical structure including a benzotriazole group can prevent redox reactions between a dissociation product and copper ions (aluminum ions). Typical examples of a functional group containing a —OCO— ester bond include a cinnamate group.

The alignment film 4a (alignment film 4b) may be a single layer or a laminate of multiple layers. For example, the alignment film 4a (alignment film 4b) may have a two-layer structure including a photo-alignment layer (adjacent to the liquid crystal layer 5) and a base layer (remote from the liquid crystal layer 5).

The liquid crystal display device 1 may be in any display mode such as a horizontal alignment mode (e.g., IPS mode, FFS mode, twisted nematic (TN) mode) or a vertical alignment mode (e.g., MVA mode, UV2A mode). For example, in the IPS mode, TN mode, MVA mode, or UV2A mode, a thin-film transistor array substrate having a structure as shown in FIG. 2 is used. In the FFS mode, for example, a thin-film transistor array substrate having a structure as shown in FIG. 3 is used. Examples of the display mode of the liquid crystal display device 1 also include an electrically controlled birefringence (ECB) mode and a 4-domain reverse twisted nematic (4D-RTN) mode.

The present invention is described in more detail below based on examples and comparative examples. The examples, however, are not intended to limit the scope of the present invention.

Example 1

A liquid crystal display device was produced by the following procedure.

(a) Preparation of Substrate and Alignment Agent

A thin-film transistor array substrate having a structure as shown in FIG. 2 was prepared as the lower substrate 2. The gate electrode 9, source electrode 10, and drain electrode 11 used were electrodes containing copper. The pixel electrode 15 used was an ITO electrode. A substrate including no electrodes was prepared as the upper substrate 3. Also, an alignment agent containing a polyamic acid represented by the following chemical formula (C-1) as a solids content was prepared. The polyamic acid represented by the following chemical formula (C-1) contained a cinnamate group as a photo-reactive functional group. The solids concentration was 6 wt %, and the solvent used was a mixed solvent of N-methylpyrrolidone (NMP), butyl cellosolve, and γ-butyrolactone.

[Chem. 7]

(C-1)

In the chemical formula (C-1), X was a moiety represented by the following chemical formula (C-2).

[Chem. 8]

(C-2)

In the chemical formula (C-1), Y was a moiety represented by the following chemical formula (C-3).

[Chem. 9]

(C-3)

(b) Formation of Alignment Film

The alignment agent prepared in the process (a) was applied to the lower substrate 2 and the upper substrate 3. The substrates to which the alignment agent has been applied were subjected to pre-baking where they were heated at 90° C. for five minutes to cause the solvent in the alignment agent to vaporize. The pre-baked substrates were then subjected to post-baking where they were heated at 230° C. for 40 minutes. The post-baking caused imidization of the polyamic acid into a polyimide. The surfaces of the substrates were then subjected to photo-alignment treatment where they were irradiated with linearly polarized UV light having a dominant wavelength of 330 nm with an intensity of 1 J/cm². Thereby, horizontal photo-alignment films (alignment film 4a and alignment film 4b) were respectively formed on the lower substrate 2 and the upper substrate 3. The horizontal photo-alignment films each had a thickness (after post-baking) of 100 nm.

(c) Preparation of Liquid Crystal Agent

A negative liquid crystal agent was prepared through the following steps.

(Step 1)

Into 30 ml of a benzene solution containing 1.63 g (10 mmol) of benzotriazole-5-carboxylic acid (molecular weight: 163) represented by the following chemical formula (D-2) was dropped 5 ml of thionyl chloride ($SOCl_2$), so that benzotriazole-5-carboxylic acid chloride (molecular weight: 181.5) represented by the following chemical formula (D-3) was synthesized. Here, 9.3 mmol of benzotriazole-5-carboxylic acid chloride was obtained and the yield thereof was 93%. Then, into 30 ml of a benzene solution containing 0.16 g (about 2.5 mmol) of 1,2-ethanediol (molecular weight: 62) represented by the following chemical formula (D-1-1) and 0.5 g (5 mmol) of triethylamine (molecular weight: 100) was dropped 10 ml of a benzene solution containing 0.92 g (about 5.0 mmol) of benzotriazole-5-carboxylic acid chloride represented by the following chemical formula (D-3) at 10° C. in nitrogen atmosphere. The mixture was reacted at 30° C. for two hours. After completion of the reaction, impurities were removed with water, followed by purification of the mixture by column chromatography which gave 0.71 g (about 2.0 mmol) of a compound (molecular weight: 352) represented by the following chemical formula (D-4-1). The yield of the obtained compound was 80%. In the column chromatography, the solvent used was a toluene/ethyl acetate mixed solvent (ratio by weight=4:1). Thereby, the additive component 5b (the following chemical formula (D-4-1)) with a chemical structure including a benzotriazole group was produced.

[Chem. 10]

(Step 2)

The additive component 5b represented by the above chemical formula (D-4-1) obtained in the above step 1 was added to negative liquid crystal (liquid crystal component 5a, anisotropy Δε of dielectric constant: −3.0), so that a negative liquid crystal agent was produced. The concentration of the additive component 5b in the liquid crystal agent was controlled to 0.02 wt %.

(d) Completion of Liquid Crystal Display Device

The negative liquid crystal agent obtained in the above process (c) used as the material of the liquid crystal layer 5 was dropped to a given position on the lower substrate 2. On the upper substrate 3 were drawn lines by applying a UV-curable sealant (product name: Photolec S-WB) available from Sekisui Chemical Co., Ltd. used as the sealant 6 with a dispenser. The substrates were then bonded together in vacuum such that the polarization directions thereof defined using the linearly polarized UV light were parallel to each other. In this state, the sealant 6 was cured by being irradiated with UV light, with the display region shielded from the light. The workpiece was heated at 130° C. for 40 minutes for realignment treatment of the liquid crystal layer 5 into an isotropic phase. The workpiece was then cooled to 20° C. A backlight was assembled to face the surface of the lower substrate 2 opposite to the liquid crystal layer 5, whereby an IPS mode liquid crystal display device including horizontal photo-alignment films was produced. The concentration of the additive component 5b in the liquid crystal layer 5 was 0.02 wt %.

Example 2

A liquid crystal display device was produced by a procedure similar to that in Example 1, except that the additive component in the liquid crystal agent was different. The liquid crystal agent used was produced through the following steps.

(Step 1)

Into 30 ml of a benzene solution containing 1.63 g (10 mmol) of benzotriazole-5-carboxylic acid (molecular weight: 163) represented by the following chemical formula (D-2) was dropped 5 ml of thionyl chloride (SOCl), so that benzotriazole-5-carboxylic acid chloride (molecular weight: 181.5) represented by the following chemical formula (D-3) was synthesized. Here, 9.3 mmol of benzotriazole-5-carboxylic acid chloride was obtained and the yield thereof was 93%. Then, into 30 ml of a benzene solution containing 0.365 g (2.5 mmol) of 1,8-octanediol (molecular weight: 146) represented by the following chemical formula (D-1-2) and 0.5 g (5 mmol) of triethylamine (molecular weight: 100) was dropped 10 ml of a benzene solution containing 0.92 g (about 5.0 mmol) of benzotriazole-5-carboxylic acid chloride represented by the following chemical formula (D-3) at 10° C. in nitrogen atmosphere. The mixture was reacted at 30° C. for two hours. After completion of the reaction, impurities were removed with water, followed by purification of the mixture by column chromatography which gave 0.87 g (about 2.0 mmol) of a compound (molecular weight: 436) represented by the following chemical formula (D-4-2). The yield of the obtained compound was 80%. In the column chromatography, the solvent used was a toluene/ethyl acetate mixed solvent (ratio by weight=4:1). Thereby, the additive component 5b (the following chemical formula (D-4-2)) with a chemical structure including a benzotriazole group was produced.

[Chem. 11]

HO—(CH$_2$)$_8$—OH + (D-1-2)

[structure D-3: ClOC-benzotriazole]

→

[structure D-4-2: benzotriazole—OCO—(CH$_2$)$_8$—OOC—benzotriazole]

(Step 2)

The additive component 5b represented by the above chemical formula (D-4-2) obtained in the above step 1 was added to negative liquid crystal (liquid crystal component 5a, anisotropy Ee of dielectric constant: −3.0), so that a negative liquid crystal agent was produced. The concentration of the additive component 5b in the liquid crystal agent was controlled to 0.02 wt %.

Example 3

A liquid crystal display device was produced by a procedure similar to that in Example 1, except that the additive component in the liquid crystal agent was different. The liquid crystal agent used was produced through the following steps.

(Step 1)

Into 30 ml of a benzene solution containing 1.63 g (10 mmol) of benzotriazole-5-carboxylic acid (molecular weight: 163) represented by the following chemical formula (D-2) was dropped 5 ml of thionyl chloride (SOCl$_2$), so that benzotriazole-5-carboxylic acid chloride (molecular weight: 181.5) represented by the following chemical formula (D-3) was synthesized. Here, 9.3 mmol of benzotriazole-5-carboxylic acid chloride was obtained and the yield thereof was 93%. Then, into 30 ml of a benzene solution containing 0.51 g (about 2.5 mmol) of 1,12-dodecanediol (molecular weight: 202) represented by the following chemical formula (D-1-3) and 0.5 g (5 mmol) of triethylamine (molecular weight: 100) was dropped 10 ml of a benzene solution containing 0.92 g (about 5.0 mmol) of benzotriazole-5-carboxylic acid chloride represented by the following chemical formula (D-3) at 10° C. in nitrogen atmosphere. The mixture was reacted at 30° C. for two hours. After completion of the reaction, impurities were removed with water, followed by purification of the mixture by column chromatography which gave 0.98 g (about 2.0 mmol) of a compound (molecular weight: 492) represented by the following chemical formula (D-4-3). The yield of the obtained compound was 80%. In the column chromatography, the solvent used was a toluene/ethyl acetate mixed solvent (ratio by weight=4:1). Thereby, the additive component 5b (the following chemical formula (D-4-3)) with a chemical structure including a benzotriazole group was produced.

[Chem. 12]

(Step 2)

The additive component 5b represented by the above chemical formula (D-4-3) obtained in the above step 1 was added to negative liquid crystal (liquid crystal component 5a, anisotropy Δε of dielectric constant: −3.0), so that a negative liquid crystal agent was produced. The concentration of the additive component 5b in the liquid crystal agent was controlled to 0.02 wt %.

Example 4

A liquid crystal display device was produced by a procedure similar to that in Example 1, except that the additive component in the liquid crystal agent was different. The liquid crystal agent used was produced through the following steps.

(Step 1)

Into 30 ml of a benzene solution containing 1.63 g (10 mmol) of benzotriazole-5-carboxylic acid (molecular weight: 163) represented by the following chemical formula (D-2) was dropped 5 ml of thionyl chloride (SOCl$_2$), so that benzotriazole-5-carboxylic acid chloride (molecular weight: 181.5) represented by the following chemical formula (D-3) was synthesized. Here, 9.3 mmol of benzotriazole-5-carboxylic acid chloride was obtained and the yield thereof was 93%. Then, into 30 ml of a benzene solution containing 0.72 g (about 2.5 mmol) of 1,18-octadecanediol (molecular weight: 286) represented by the following chemical formula (D-1-4) and 0.5 g (5 mmol) of triethylamine (molecular weight: 100) was dropped 10 ml of a benzene solution containing 0.92 g (about 5.0 mmol) of benzotriazole-5-carboxylic acid chloride represented by the following chemical formula (D-3) at 10° C. in nitrogen atmosphere. The mixture was reacted at 30° C. for two hours. After completion of the reaction, impurities were removed with water, followed by purification of the mixture by column chromatography which gave 1.15 g (about 2.0 mmol) of a compound (molecular weight: 576) represented by the following chemical formula (D-4-4). The yield of the obtained compound was 80%. In the column chromatography, the solvent used was a toluene/ethyl acetate mixed solvent (ratio by weight=4:1). Thereby, the additive component 5b (the following chemical formula (D-4-4)) with a chemical structure including a benzotriazole group was produced.

[Chem. 13]

(Step 2)

The additive component 5b represented by the above chemical formula (D-4-4) obtained in the above step 1 was added to negative liquid crystal (liquid crystal component 5a, anisotropy Δε of dielectric constant: −3.0), so that a negative liquid crystal agent was produced. The concentration of the additive component 5b in the liquid crystal agent was controlled to 0.02 wt %.

Comparative Example 1

A liquid crystal display device was produced by a procedure similar to that in Example 1, except that no additive component was added to the liquid crystal agent.

Comparative Example 2

A liquid crystal display device was produced by a procedure similar to that in Example 1, except that the additive component in the liquid crystal agent was different.

The liquid crystal agent used was a negative liquid crystal agent produced by adding an additive component with a chemical structure represented by the following chemical formula (E) to negative liquid crystal (anisotropy Δε of dielectric constant: −3.0). The concentration of the additive component in the liquid crystal agent was controlled to 0.02 wt %.

[Chem. 14]

(E)

[Evaluation Test 1]

The liquid crystal display devices of Examples 1 to 4 and Comparative Examples 1 and 2 were left to stand for 5000 hours, with the backlight (luminance: 5000 cd/m²) turned on and the temperature set to 75° C. The voltage holding ratio and the contrast ratio of the liquid crystal display device of each example were measured before and after the standing. The measured results are shown in Table 1. The voltage holding ratio was measured with an LC material characteristics measurement system (product name: Model 6254) available from Toyo Corporation. The applied voltage was 1 V and the measurement temperature was 70° C. The contrast ratio was measured with a spectroradiometer (product name: SR-UL1) available from Topcon Corporation at a measurement temperature of 25° C.

TABLE 1

|  | Before standing | | After standing | |
|---|---|---|---|---|
|  | Voltage holding ratio (%) | Contrast ratio | Voltage holding ratio (%) | Contrast ratio |
| Example 1 | 99.5 | 1500 | 97.1 | 1300 |
| Example 2 | 99.5 | 1500 | 97.1 | 1290 |
| Example 3 | 99.5 | 1500 | 97.4 | 1300 |
| Example 4 | 99.5 | 1500 | 97.3 | 1350 |
| Comparative Example 1 | 99.5 | 1500 | 86.5 | 800 |
| Comparative Example 2 | 99.0 | 1450 | 95.2 | 1100 |

As shown in Table 1, long-lasting favorable voltage holding ratio and contrast ratio were achieved in each of Examples 1 to 4. These results seem to be owing to a complex formed between the benzotriazole group and copper ions which prevented redox reactions between the copper ions and carboxylic acid contained in the polyamic acid and/or carboxylic acid generated by dissociation (hydrolysis) of the —OCO— ester bond contained in the cinnamate group. Also, in each of Examples 1 to 4, the decrease in voltage holding ratio and contrast ratio from the values before the standing to those after the standing did not appear to depend on the type of additive component.

In contrast, in Comparative Example 1, the voltage holding ratio and the contrast ratio significantly decreased after the standing. The cause of these results seems to be radical formation through a redox reaction between copper ions and carboxylic acid in the polyamic acid and/or carboxylic acid generated by dissociation (hydrolysis) of the —OCO— ester bond contained in the cinnamate group, followed by generation of ionic impurities by the radicals in the liquid crystal layer.

In Comparative Example 2, the decrease in voltage holding ratio and contrast ratio from the values before the standing to those after the standing was less significant than that in Comparative Example 1. Still, in Comparative Example 2, the voltage holding ratio and contrast ratio before the standing were lower than those in the other examples, and the decrease in voltage holding ratio and contrast ratio from the values before the standing to those after the standing was more significant than those in Examples 1 to 4. Possible causes thereof are the following (i) to (iii).

(i) Hydroxyl groups in the chemical structure represented by the above chemical formula (E) were ionized, and thus ionic impurities were more likely to be generated.

(ii) Hydroxyl groups in the chemical structure represented by the above chemical formula (E) caused hydrogen bonding between molecules of the additive component to stick them together, deteriorating the alignment performance of the liquid crystal molecules.

(iii) A phenolic skeleton of the chemical structure represented by the above chemical formula (E) hindered copper ion complex formation.

Example 5

A liquid crystal display device was produced by a procedure similar to that in Example 2, except that the display mode of the liquid crystal display device was different.

A thin-film transistor array substrate having a structure as shown in FIG. 3 was prepared as the lower substrate 2. The gate electrode 9, source electrode 10, and drain electrode 11 used were electrodes containing copper. The lower layer electrode 17 and upper layer electrode 18 used were ITO electrodes. A substrate including no electrodes was prepared as the upper substrate 3.

Thereby, an FFS mode liquid crystal display device including horizontal photo-alignment films was produced.

Example 6

A liquid crystal display device was produced by a procedure similar to that in Example 5, except that the liquid crystal component used was positive liquid crystal.

Comparative Example 3

A liquid crystal display device was produced by a procedure similar to that in Example 5, except that no additive component was added to the liquid crystal agent.

Comparative Example 4

A liquid crystal display device was produced by a procedure similar to that in Example 6, except that no additive component was added to the liquid crystal agent.

[Evaluation Test 2]

By a procedure similar to that in Evaluation Test 1, the liquid crystal display devices of Examples 5 and 6 and Comparative Examples 3 and 4 were left to stand for 5000 hours, with the backlight turned on and the temperature set to 75° C. The voltage holding ratio and contrast ratio were measured before and after the standing. The measured results are shown in Table 2.

TABLE 2

|  | Before standing | | After standing | |
|---|---|---|---|---|
|  | Voltage holding ratio (%) | Contrast ratio | Voltage holding ratio (%) | Contrast ratio |
| Example 5 | 99.5 | 1500 | 97.2 | 1310 |
| Example 6 | 99.5 | 1400 | 98.2 | 1400 |
| Comparative Example 3 | 99.5 | 1500 | 86.3 | 650 |
| Comparative Example 4 | 99.5 | 1400 | 98.1 | 1400 |

As shown in Table 2, long-lasting favorable voltage holding ratio and contrast ratio were achieved in each of Examples 5 and 6. These results seem to be owing to a complex formed between the benzotriazole group and copper ions which prevented redox reactions between the copper ions and carboxylic acid contained in the polyamic acid and/or carboxylic acid generated by dissociation (hydrolysis) of the —OCO— ester bond contained in the cinnamate group.

In contrast, in Comparative Example 3, the voltage holding ratio and the contrast ratio significantly decreased after the standing. In Comparative Example 4, the decrease in voltage holding ratio and contrast ratio from the values before the standing to those after the standing was less significant than that in Comparative Example 3. These results show that negative liquid crystal (Comparative Example 3) is more likely to take in copper ions and cause a decrease in voltage holding ratio and contrast ratio than positive liquid crystal (Comparative Example 4). Yet, even in the case of employing negative liquid crystal, long-lasting favorable voltage holding ratio and contrast ratio can be achieved by adding an additive component with a chemical structure including a benzotriazole group to the liquid crystal layer as in Example 5.

Example 7

A liquid crystal display device was produced by the following procedure.

(a) Preparation of Substrate and Alignment Agent

A thin-film transistor array substrate having a structure as shown in FIG. 2 was prepared as the lower substrate 2. The gate electrode 9, source electrode 10, and drain electrode 11 used were electrodes containing copper. The pixel electrode 15 used was an ITO electrode. A substrate including a common electrode and a rib was prepared as the upper substrate 3. The common electrode used was an ITO electrode. Also, an alignment agent containing a polyamic acid represented by the following chemical formula (C-1) as a solids content was prepared. The solids concentration was 6 wt %, and the solvent used was a mixed solvent of NMP, butyl cellosolve, and γ-butyrolactone.

[Chem. 15]

(C-1)

In the chemical formula (C-1), X was a moiety represented by the following chemical formula (C-2).

[Chem. 16]

(C-2)

In the chemical formula (C-1), Y was a moiety represented by the following chemical formula (C-4).

[Chem. 17]

(C-4)

(b) Formation of Alignment Film

The alignment agent prepared in the process (a) was applied to the lower substrate 2 and the upper substrate 3. The substrates to which the alignment agent has been applied were subjected to pre-baking where they were heated at 90° C. for five minutes to cause the solvent in the alignment agent to vaporize. The pre-baked substrates were then subjected to post-baking where they were heated at 200° C. for 40 minutes. The post-baking caused imidization of the polyamic acid into a polyimide. Thereby, vertical alignment films (alignment film 4a and alignment film 4b) were respectively formed on the lower substrate 2 and the upper substrate 3. The vertical alignment films each had a thickness (after post-baking) of 100 nm.

(c) Preparation of Liquid Crystal Agent

A negative liquid crystal agent was prepared through the following steps.

(Step 1)

Into 30 ml of a benzene solution containing 1.63 g (10 mmol) of benzotriazole-5-carboxylic acid (molecular weight: 163) represented by the following chemical formula (D-2) was dropped 5 ml of thionyl chloride (SOCl$_2$), so that benzotriazole-5-carboxylic acid chloride (molecular weight: 181.5) represented by the following chemical formula (D-3) was synthesized. Here, 9.3 mmol of benzotriazole-5-carboxylic acid chloride was obtained and the yield thereof was 93%. Then, into 30 ml of a benzene solution containing 0.28 g (about 2.5 mmol) of 1,4-benzenediol (molecular weight: 110) represented by the following chemical formula (D-1-5) and 0.5 g (5 mmol) of triethylamine (molecular weight: 100) was dropped 10 ml of a benzene solution containing 0.92 g (about 5.0 mmol) of benzotriazole-5-carboxylic acid chloride represented by the following chemical formula (D-3) at 10° C. in nitrogen atmosphere. The mixture was reacted at 30° C. for two hours. After completion of the reaction, impurities were removed with water, followed by purification of the mixture by column chromatography which gave 0.80 g (2.0 mmol) of a compound (molecular weight: 400) represented by the following chemical formula (D-4-5). The yield of the obtained compound was 80%. In the column chromatography, the solvent used was a toluene/ethyl acetate mixed solvent (ratio by weight=4:1). Thereby, the additive component 5b (the following chemical formula (D-4-5)) with a chemical structure including a benzotriazole group was produced.

[Chem. 18]

(Step 2)

The additive component 5b represented by the above chemical formula (D-4-5) obtained in the above step 1 was added to negative liquid crystal (liquid crystal component 5a, anisotropy Δε of dielectric constant: −3.0), so that a negative liquid crystal agent was produced. The concentration of the additive component 5b in the liquid crystal agent was controlled to 0.02 wt %.

(d) Completion of Liquid Crystal Display Device

The negative liquid crystal agent obtained in the above process (c) used as the material of the liquid crystal layer 5 was dropped to a given position on the lower substrate 2. On the upper substrate 3 were drawn lines by applying a UV-curable sealant (product name: Photolec S-WB) available from Sekisui Chemical Co., Ltd. used as the sealant 6 with a dispenser. The substrates were then bonded together in vacuum. In this state, the sealant 6 was cured by being irradiating with UV light, with the display region shielded from the light. The workpiece was heated at 130° C. for 40 minutes for realignment treatment of the liquid crystal layer 5 into an isotropic phase. The workpiece was then cooled to 20° C. A backlight was assembled to face the surface of the lower substrate 2 opposite to the liquid crystal layer 5, whereby an MVA mode liquid crystal display device including vertical alignment films was produced. The concentration of the additive component 5b in the liquid crystal layer 5 was 0.02 wt %.

Comparative Example 5

A liquid crystal display device was produced by a procedure similar to that in Example 7, except that no additive component was added to the liquid crystal agent.

[Evaluation Test 3]

By a procedure similar to that in Evaluation Test 1, the liquid crystal display devices of Example 7 and Comparative Example 5 were left to stand for 5000 hours, with the backlight turned on and the temperature set to 75° C. The voltage holding ratio and the contrast ratio of the liquid crystal display device of each example were measured before and after the standing. The results are shown in Table 3.

TABLE 3

|  | Before standing | | After standing | |
| --- | --- | --- | --- | --- |
|  | Voltage holding ratio (%) | Contrast ratio | Voltage holding ratio (%) | Contrast ratio |
| Example 7 | 99.5 | 4000 | 98.5 | 3800 |
| Comparative Example 5 | 99.5 | 4000 | 92.5 | 2700 |

As shown in Table 3, long-lasting favorable voltage holding ratio and contrast ratio were achieved in Example 7. These results seem to be owing to a complex formed between the benzotriazole groups and copper ions which prevented redox reactions between the copper ions and carboxylic acid in the polyamic acid.

In contrast, in Comparative Example 5, the voltage holding ratio and the contrast ratio significantly decreased after the standing. The cause of these results seems to be radical formation through a redox reaction between copper ions and carboxylic acid in the polyamic acid, followed by generation of ionic impurities by the radicals in the liquid crystal layer.

Example 8

A liquid crystal display device was produced by the following procedure.

(a) Preparation of Substrate and Alignment Agent

A thin-film transistor array substrate having a structure as shown in FIG. 2 was prepared as the lower substrate 2. The gate electrode 9, source electrode 10, and drain electrode 11 used were electrodes containing copper. The pixel electrode 15 used was an ITO electrode. A substrate including a common electrode was prepared as the upper substrate 3. The common electrode used was an ITO electrode. Also, an alignment agent containing a polysiloxane represented by the following chemical formula (F-1) and a polyamic acid represented by the following chemical formula (C-1) as solids contents was prepared. The polysiloxane represented by the following chemical formula (F-1) contained a cinnamate group as the photo-reactive functional group. The polysiloxane solids concentration was 0.5 wt %, and the polyamic acid solids concentration was 5.5 wt %. The solvent used was a mixed solvent of NMP, butyl cellosolve, and γ-butyrolactone.

[Chem. 19]

(F-1)

In the chemical formula (F-1), X' was a methoxy group.

In the chemical formula (F-1), R4's were the same as or different from each other and represented by the following chemical formula (F-2) or (F-3).

[Chem. 20]

(F-2)

[Chem. 21]

(F-3)

(C-1)

In the chemical formula (C-1), X was a moiety represented by the following chemical formula (C-2).

[Chem. 22]

(C-2)

In the chemical formula (C-1), Y was a moiety represented by the following chemical formula (C-4).

[Chem. 23]

(C-4)

(b) Formation of Alignment Film

The alignment agent prepared in the process (a) was applied to the lower substrate 2 and the upper substrate 3. The substrates to which the alignment agent has been applied were subjected to pre-baking where they were heated at 90° C. for five minutes to cause the solvent in the alignment agent to vaporize. The pre-baked substrates were then subjected to post-baking where they were heated at 230° C. for 40 minutes. The surfaces of the substrates were subjected to four-domain photo-alignment treatment where they were irradiated with linearly polarized UV light having a dominant wavelength of 330 nm with an intensity of 50 mJ/cm² such that the pre-tilt angle was set to about 88.6°. Thereby, vertical photo-alignment films (alignment film 4a and alignment film 4b) were respectively formed on the lower substrate 2 and the upper substrate 3. The obtained vertical photo-alignment films each had a two-layer structure. In each of the vertical photo-alignment films, the photo-alignment layer (adjacent to the liquid crystal layer 5) contained a polymer derived from the polysiloxane represented by the above chemical formula (F-1), and the base layer (remote from the liquid crystal layer 5) contained a polymer derived from the polyamic acid represented by the above chemical formula (C-1). The vertical photo-alignment films each had a thickness (after post-baking) of 100 nm.

(c) Preparation of Liquid Crystal Agent

A negative liquid crystal agent was prepared through the following steps.

(Step 1)

Into 30 ml of a benzene solution containing 1.63 g (10 mmol) of benzotriazole-5-carboxylic acid (molecular weight: 163) represented by the following chemical formula (D-2) was dropped 5 ml of thionyl chloride (SOCl₂), so that benzotriazole-5-carboxylic acid chloride (molecular weight: 181.5) represented by the following chemical formula (D-3) was synthesized. Here, 9.3 mmol of benzotriazole-5-carboxylic acid chloride was obtained and the yield thereof was 93%. Then, into 30 ml of a benzene solution containing 1.11 g (5 mmol) of 1-hydroxy-4-octyl oxyphenylene (molecular weight: 222) represented by the following chemical formula (D-1-6) and 0.5 g (5 mmol) of triethylamine (molecular weight: 100) was dropped 10 ml of a benzene solution containing 0.92 g (about 5.0 mmol) of benzotriazole-5-carboxylic acid chloride represented by the following chemical formula (D-3) at 10° C. in nitrogen atmosphere. The mixture was reacted at 30° C. for two hours. After completion of the reaction, impurities were removed with water, followed by purification of the mixture by column chromatography which gave 1.50 g (about 4.1 mmol) of a compound (molecular weight: 367) represented by the following chemical formula (D-4-6). The yield of the obtained compound was 82%. In the column chromatography, the solvent used was a toluene/ethyl acetate mixed solvent (ratio by weight=4:1). Thereby, the additive component 5b (the following chemical formula (D-4-6)) with a chemical structure including a benzotriazole group was produced.

[Chem. 24]

(D-4-6)

(Step 2)

The additive component 5b represented by the above chemical formula (D-4-6) obtained in the above step 1 was added to negative liquid crystal (liquid crystal component 5a, anisotropy Δε of dielectric constant: −3.0), so that a negative liquid crystal agent was produced. The concentration of the additive component 5b in the liquid crystal agent was controlled to 0.02 wt %.

(d) Completion of Liquid Crystal Display Device

The negative liquid crystal agent obtained in the above process (c) used as the material of the liquid crystal layer 5 was dropped to a given position on the lower substrate 2. On the upper substrate 3 were drawn lines by applying a UV-curable sealant (product name: Photolec S-WB) available from Sekisui Chemical Co., Ltd. used as the sealant 6 with a dispenser. The substrates were then bonded together in vacuum such that the polarization directions thereof defined using the linearly polarized UV light were parallel to each other. In this state, the sealant 6 was cured by being irradiated with UV light, with the display region shielded from the light. The workpiece was heated at 130° C. for 40 minutes for realignment treatment of the liquid crystal layer 5 into an isotropic phase. The workpiece was then cooled to 20° C. A backlight was assembled to face the surface of the lower substrate 2 opposite to the liquid crystal layer 5, whereby a UV2A mode liquid crystal display device including vertical photo-alignment films was produced. The concentration of the additive component 5b in the liquid crystal layer 5 was 0.02 wt %.

Comparative Example 6

A liquid crystal display device was produced by a procedure similar to that in Example 8, except that no additive component was added to the liquid crystal agent.

Evaluation Test 4

By a procedure similar to that in Evaluation Test 1, the liquid crystal display devices of Example 8 and Comparative Example 6 were left to stand for 5000 hours, with the backlight turned on and the temperature set to 75° C. The voltage holding ratio and the contrast ratio of the liquid crystal display device of each example was measured before and after the standing. The measured results are shown in Table 4.

TABLE 4

| | Before standing | | After standing | |
|---|---|---|---|---|
| | Voltage holding ratio (%) | Contrast ratio | Voltage holding ratio (%) | Contrast ratio |
| Example 8 | 99.1 | 5000 | 97.8 | 4500 |
| Comparative Example 6 | 99.1 | 5000 | 90.5 | 3900 |

As shown in Table 4, long-lasting favorable voltage holding ratio and contrast ratio were achieved in Example 8. These results seem to be owing to a complex formed between the benzotriazole group and copper ions which prevented redox reactions between the copper ions and carboxylic acid generated by dissociation (hydrolysis) of the —OCO— ester bond contained in the cinnamate group.

In contrast, in Comparative Example 6, the voltage holding ratio and the contrast ratio significantly decreased after the standing. The cause of these results seems to be radical formation through a redox reaction between copper ions and carboxylic acid generated by dissociation (hydrolysis) of the —OCO— ester bond contained in the cinnamate group, followed by generation of ionic impurities by the radicals in the liquid crystal layer.

Example 9

A liquid crystal display device was produced by a procedure similar to that in Example 1, except that the gate electrode, source electrode, and drain electrode used were electrodes containing aluminum.

Example 10

A liquid crystal display device was produced by a procedure similar to that in Example 2, except that the gate electrode, source electrode, and drain electrode used were electrodes containing aluminum.

Example 11

A liquid crystal display device was produced by a procedure similar to that in Example 3, except that the gate electrode, source electrode, and drain electrode used were electrodes containing aluminum.

Example 12

A liquid crystal display device was produced by a procedure similar to that in Example 4, except that the gate electrode, source electrode, and drain electrode used were electrodes containing aluminum.

Comparative Example 7

A liquid crystal display device was produced by a procedure similar to that in Comparative Example 1, except that the gate electrode, source electrode, and drain electrode used were electrodes containing aluminum.

[Evaluation Test 5]

By a procedure similar to that in Evaluation Test 1, the liquid crystal display devices of Examples 9 to 12 and Comparative Example 7 were left to stand for 5000 hours, with the backlight turned on and the temperature set to 75° C. The voltage holding ratio and contrast ratio were measured before and after the standing. The measured results are shown in Table 5.

TABLE 5

| | Before standing | | After standing | |
| --- | --- | --- | --- | --- |
| | Voltage holding ratio (%) | Contrast ratio | Voltage holding ratio (%) | Contrast ratio |
| Example 9 | 99.5 | 1500 | 98.6 | 1450 |
| Example 10 | 99.5 | 1500 | 98.5 | 1450 |

TABLE 5-continued

| | Before standing | | After standing | |
| --- | --- | --- | --- | --- |
| | Voltage holding ratio (%) | Contrast ratio | Voltage holding ratio (%) | Contrast ratio |
| Example 11 | 99.5 | 1500 | 98.7 | 1450 |
| Example 12 | 99.5 | 1500 | 98.4 | 1450 |
| Comparative Example 7 | 99.5 | 1500 | 93.3 | 1050 |

As shown in Table 5, long-lasting favorable voltage holding ratio and contrast ratio were achieved in each of Examples 9 to 12. These results seem to be owing to a complex formed between the benzotriazole group and aluminum ions which prevented redox reactions between the aluminum ions and carboxylic acid in the polyamic acid and/or carboxylic acid generated by dissociation (hydrolysis) of the —OCO— ester bond contained in the cinnamate group. Also, in each of Examples 9 to 12, the decrease in voltage holding ratio and contrast ratio from the values before the standing to those after the standing did not appear to depend on the type of additive component.

In contrast, in Comparative Example 7, the voltage holding ratio and the contrast ratio significantly decreased after the standing. The cause of these results seems to be radical formation through a redox reaction between aluminum ions and carboxylic acid in the polyamic acid and/or carboxylic acid generated by dissociation (hydrolysis) of the —OCO— ester bond contained in the cinnamate group, followed by generation of ionic impurities by the radicals in the liquid crystal layer.

These results show that the effect of the present invention was achieved even in the case where the gate electrode, source electrode, and drain electrode were electrodes containing aluminum, as in the case where they were electrodes containing copper.

[Additional Remarks]

Examples of preferred modes of the liquid crystal display device of the present invention are shown below. These examples may appropriately be combined within the spirit of the present invention.

The chemical structure described above may include a structure represented by the following chemical formula (2). Thereby, a decrease in nematic-isotropic phase transition temperature ($T_{NI}$) of the above liquid crystal component can appropriately be prevented.

[Chem. 25]

(2)

In the chemical formula (2), $R^1$ represents a —O— group, —S— group, —NH— group, —CO— group, —COO— group, —OCO— group, —NHCO— group, —CONH— group, —CH$_2$— group, —CF$_2$— group, or direct bond; $R^2$ represents —$R^3$-Bt, a hydrogen atom, halogen atom, —CN group, —NO$_2$ group, —NCO group, —NCS group, —OCN group, —OH group, or C1-C18 linear or branched alkyl group; and Bt is represented by the following chemical formula (1).

(1)

$R^3$ represents a C1-C18 linear or branched alkylene group; a hydrogen atom in $R^3$ may be replaced with a fluorine atom or chlorine atom; $A^1$ and $A^2$ are the same as or different from each other and each represent a 1,4-phenylene group, naphthalene-1,4-diyl group, naphthalene-2,6-diyl group, 1,4-cyclohexylene group, or C2-C18 alkyl, alkylene, unsaturated alkyl, or unsaturated alkylene group; —$CH_2$— groups contained in $A^1$ and $A^2$ may each be replaced with a —O— group or —S— group, unless they are adjacent to each other; at least one of hydrogen atoms in $A^1$ and $A^2$ may be replaced with a fluorine atom, chlorine atom, —CN group, or C1-C6 alkyl, alkoxy, alkylcarbonyl, alkoxycarbonyl, or alkylcarbonyloxy group; Z represents a —O— group, —S— group, —NH— group, —CO— group, —COO— group, —OCO— group, —NHCO— group, —CONH— group, —$CH_2$— group, —$CF_2$— group, or direct bond; and n represents 0, 1, or 2.

The additive component may have a molecular weight in the range of 300 to 3000. Such an additive component can appropriately be prevented from volatilizing through formation steps of the liquid crystal layer (e.g., liquid crystal dropping step). The additive component can also exhibit sufficient solubility in the liquid crystal component and can be prevented from separating from the liquid crystal component.

The liquid crystal layer may contain the additive component at a concentration in the range of 0.001 to 0.2 wt %. Such a liquid crystal layer can effectively cause the benzotriazole group to form a complex with the copper ions (aluminum ions), achieving a sufficient effect of preventing redox reactions. The liquid crystal layer can also appropriately prevent deterioration of properties such as the initial voltage holding ratio and alignment performance of liquid crystal molecules, as well as a change in the nematic-isotropic phase transition temperature ($T_{NI}$) of the liquid crystal component.

The alignment film may contain a polymer including a photo-reactive functional group. Thereby, the alignment film can function as a photo-alignment film.

The photo-reactive functional group may include at least one functional group selected from the group consisting of a cinnamate group, chalcone group, coumarin group, azobenzene group, and tolane group. Such a functional group enables effective utilization of the photo-reactive functional group.

The alignment film may align liquid crystal molecules in the liquid crystal component in a direction parallel to a surface of the alignment film. Such an alignment film can function as a horizontal alignment film.

The alignment film may align liquid crystal molecules in the liquid crystal component in a direction perpendicular to a surface of the alignment film. Such an alignment film can function as a vertical alignment film.

The alignment film may contain a polyamic acid and/or a polyimide. The alignment film may contain a polysiloxane. Such a compound enables effective use of the alignment film.

The alignment film may contain a polymer that contains a —OCO— ester bond in a side chain. The concept of the present invention is appropriately applicable to the case where the alignment film contains a polymer that contains a —OCO— ester bond in a side chain.

The electrode and/or conductive line that contain(s) copper or aluminum may be in direct contact with the alignment film. The concept of the present invention is appropriately applicable to the case where the electrode and/or conductive line that contain(s) copper or aluminum are/is in direct contact with the alignment film.

The electrode that contains copper or aluminum may include at least one selected from the group consisting of a gate electrode, source electrode, and drain electrode of a thin-film transistor element. The concept of the present invention is appropriately applicable to the case where at least one of the gate electrode, the source electrode, and the drain electrode is an electrode that contains copper or aluminum.

The liquid crystal molecules in the liquid crystal component may have a negative anisotropy of dielectric constant. Although moisture and copper ions (aluminum ions) are more likely to be taken into a liquid crystal layer containing liquid crystal molecules with a negative anisotropy of dielectric constant than into that containing liquid crystal molecules with a positive anisotropy of dielectric constant, the concept of the present invention is appropriately applicable even to such a case.

The liquid crystal display device may be in a display mode of an IPS mode, FFS mode, TN mode, MVA mode, or UV2A mode. The concept of the present invention is appropriately applicable to the case where the liquid crystal display device is in a display mode of an IPS mode, FFS mode, TN mode, MVA mode, or UV2A mode.

REFERENCE SIGNS LIST

1: Liquid crystal display device
2: Lower substrate
3: Upper substrate
4a, 4b: Alignment film
5: Liquid crystal layer
5a: Liquid crystal component
5b: Additive component
6: Sealant
7: Transparent substrate
8: Thin-film transistor element
9: Gate electrode (gate bus line)
10: Source electrode (source bus line)
11: Drain electrode
12: Semiconductor layer
13: Gate insulator
14a, 14b: Interlayer insulating film
15: Pixel electrode
16: Contact hole
17: Lower layer electrode
18: Upper layer electrode
P: Polymer
M: Main chain
S: Side chain
D: Dissociation product

The invention claimed is:
1. A liquid crystal display device comprising:
paired substrates disposed to face each other;
a liquid crystal layer disposed between the paired substrates; and an alignment film disposed between at least one of the substrates and the liquid crystal layer, the at least one of the substrates including an electrode and/or a conductive line that contain(s) copper or aluminum, in direct contact with the alignment film, the liquid crystal layer containing a liquid crystal component and an additive component with a chemical structure including a benzotriazole group represented by the following chemical formula (1):

[Chem. 1]

(1)

wherein the chemical structure includes a structure represented by the following chemical formula (2):

[Chem. 2]

(2)

wherein $R^1$ represents a —O— group, —S— group, —NH— group, —CO— group, —COO— group, —OOO— group, —NHCO— group, —CONH— group, —CH$_2$— group, —CF$_2$— group, or direct bond; $R^2$ represents —$R^3$-Bt, a hydrogen atom, halogen atom, —CN group, —NO$_2$ group, —NCO group, —NCS group, —OCN group, —OH group, or C1-C18 linear or branched alkyl group; and Bt is represented by the following chemical formula (1):

[Chem. 3]

(1)

wherein $R^3$ represents a C1-C18 linear or branched alkylene group; a hydrogen atom in $R^3$ may be replaced with a fluorine atom or chlorine atom; $A^1$ and $A^2$ are the same as or different from each other and each represent a 1,4-phenylene group, naphthalene-1,4-diyl group, naphthalene-2,6-diyl group, 1,4-cyclohexylene group, or C2-C18 alkyl, alkylene, unsaturated alkyl, or unsaturated alkylene group; —CH$_2$— groups contained in $A^1$ and $A^2$ may each be replaced with a —O— group or —S— group, unless they are adjacent to each other; at least one of hydrogen atoms in $A^1$ and $A^2$ may be replaced with a fluorine atom, chlorine atom, —CN group, or C1-C6 alkyl, alkoxy, alkylcarbonyl, alkoxycarbonyl, or alkylcarbonyloxy group; Z represents a —O— group, —S— group, —NH— group, —CO— group, —COO— group, —OOO— group, —NHCO— group, —CONH— group, —CH$_2$— group, —CF$_2$— group, or direct bond; and n represents 0, 1, or 2;

wherein the liquid crystal molecules in the liquid crystal component have a negative or a positive anisotropy of dielectric constant, and the alignment film includes a polymer that contains a carboxyl group or a —OCO— ester bond in a side chain.

2. The liquid crystal display device according to claim 1, wherein the additive component has a molecular weight in the range of 300 to 3000.

3. The liquid crystal display device according to claim 1, wherein the liquid crystal layer contains the additive component at a concentration in the range of 0.001 to 0.2 wt %.

4. The liquid crystal display device according to claim 1, wherein the alignment film contains a polymer including a photoreactive functional group.

5. The liquid crystal display device according to claim 4, wherein the photo-reactive functional group includes at least one functional group selected from the group consisting of a cinnamate group, chalcone group, coumarin group, azobenzene group, and tolane group.

6. The liquid crystal display device according to claim 1, wherein the alignment film aligns liquid crystal molecules in the liquid crystal component in a direction parallel to a surface of the alignment film.

7. The liquid crystal display device according to claim 1, wherein the alignment film aligns liquid crystal molecules in the liquid crystal component in a direction perpendicular to a surface of the alignment film.

8. The liquid crystal display device according to claim 1, wherein the alignment film contains a polyamic acid and/or a polyimide.

9. The liquid crystal display device according to claim 1, wherein the alignment film contains a polysiloxane.

10. The liquid crystal display device according to claim 1, wherein the electrode that contains copper or aluminum includes at least one selected from the group consisting of a gate electrode, source electrode, and drain electrode of a thing film transistor element.

11. The liquid crystal display device according to claim 1, wherein the liquid crystal molecules in the liquid crystal component have a negative anisotropy of dielectric constant.

12. The liquid crystal display device according to claim 1, wherein the liquid crystal display device is in a display mode of an IPS mode, FFS mode, TN mode, MVA mode, or UV2A mode.

* * * * *